United States Patent [19]

Kelly et al.

[11] 4,292,684
[45] Sep. 29, 1981

[54] FORMAT FOR DIGITAL TAPE RECORDER

[75] Inventors: Michael J. Kelly, Erin Prairie Township, St. Croix County, Wis.; Robert J. Youngquist, White Bear Lake, Minn.

[73] Assignee: Minnesota Mining and Manufacturing Company, Saint Paul, Minn.

[21] Appl. No.: 81,880

[22] Filed: Oct. 15, 1979

Related U.S. Application Data

[63] Continuation-in-part of Ser. No. 956,581, Nov. 1, 1978, abandoned.

[51] Int. Cl.³ .................. G06F 11/12; G11B 27/00
[52] U.S. Cl. ............................... 371/38; 360/53; 371/40; 371/65
[58] Field of Search ........... 371/38, 40, 65; 360/38, 360/53

[56] References Cited

U.S. PATENT DOCUMENTS

| | | |
|---|---|---|
| Re. 28,923 | 8/1976 | Patel .................................. 371/38 |
| 3,774,154 | 11/1973 | Devore et al. ..................... 371/38 |
| 3,786,201 | 1/1974 | Myers et al. ...................... 360/32 |
| 3,800,281 | 3/1974 | Devore et al. ..................... 371/38 |
| 3,851,306 | 11/1974 | Patel .................................. 371/38 |
| 3,876,978 | 4/1975 | Bossen et al. ..................... 371/51 |
| 3,913,068 | 10/1975 | Patel .................................. 371/38 |
| 4,145,683 | 3/1979 | Brookhart ......................... 371/38 |
| 4,146,099 | 3/1979 | Matshusima ...................... 371/51 |

FOREIGN PATENT DOCUMENTS

2012460 7/1979 United Kingdom ............... 371/40

Primary Examiner—Charles E. Atkinson
Attorney, Agent, or Firm—Cruzan Alexander; Donald M. Sell; William B. Barte

[57] ABSTRACT

A recorder for storage and retrieval of digitized signals on a single track of a suitable record medium is disclosed. The recorder includes networks for partitioning digitized audio signals into successive frames, each of which preferably contains a plurality of alternate data words and parity words, followed, at the end of each frame by an error check code word and a sync word. The parity words of a given frame are generated from data words of other frames sufficiently spatially remote from the given frame to minimize the probability that a single drop out or other defect in a record medium will, upon playback, cause the loss of data associated with both the given frame and the other frames. During playback, each frame is checked for errors, and if found, corrected data words are reconstructed from the parity words and data words of other frames located both ahead and behind the erroneous frame, and are inserted in the data stream in place of the erroneous data words.

12 Claims, 5 Drawing Figures

FORMAT FOR DIGITAL TAPE RECORDER

RELATED APPLICATIONS

This application is a continuation-in-part of U.S. Ser. No. 956,581 filed Nov. 1, 1978 and relates to U.S. Pat. No. 4,145,683 and to copending U.S. Ser. No. 021,177 (Brookhart) filed Mar. 16, 1979 which is a continuation-in-part of the earlier identified patent, all of which disclose and claim related signal processing circuits and which are assigned to the same assignee as the present application. The application is incorporated herein by reference.

BACKGROUND OF THE INVENTION

(1) Field of the Invention

This invention relates to electronic equipment for processing signals, particularly analog signals, such as those in the audio and video range, into corresponding digital signals suitable for recording on a record medium such as magnetic recording tape, and particularly relates to systems for correction of errors when such digitized signals are played back and are optionally reconverted into an output analog signal.

(2) Description of the Prior Art

The preparation of commercial recordings, both audio and video generally begins at the point where a number of tracks, such as 4, 8 or 16 tracks of analog audio signals are recorded onto a master tape, the master tape is then mixed with other masters to dub in other signals and the mixed masters are further mixed into sub-master tapes having a single monaural track, two stereo tracks or four quadraphonic tracks. The sub-master tapes are then used as the basis for manufacture of both record discs and prerecorded tapes. Any defects or deficiencies inherent in the analog signals are thus embodied in the subsequent generation master and sub-master recordings and become a part of all manufactured copies. In order to greatly reduce, if not completely eliminate many such deficiencies, professional recorders are now widely considering the adaptation of digital recorders such as are generally used in instrumentation and computer data processing fields for audio and video uses. In such recorders, as for example that depicted in U.S. Pat. No. 3,786,201 (Myers et al), the analog signals are periodically sampled and a digital word is generated corresponding to each sample. Since the signal to tape interface affects only the fine structure digit carrying signal and not the numerical content per se, the integrity of the digitized audio signal is maintained and no degradation in the quality of the recorded sound occurs, even with repeated re-recording, mixing and the like. Typical decreases in the amplitude or pulse rise time, etc. of the digital pulses may be recorded by conventional signal processing techniques.

However, despite the inherent desirability of such digital audio and video recorders, general acceptance in the professional recording industry has not yet been achieved. It is believed that at least part of the reason for the lack of acceptance has been the propensity of errors in the digitized signal as may result from defects in the record medium such as the familiar drop-out problem in magnetic recording tape. Rather than merely causing a momentary loss of signal as in conventional recorders, the loss of a digital bit may, if it occurs at a most inopportune time, cause the signal to lose sync entirely such that all subsequent portions of the digital signal are meaningless. To avoid such total loss, it is conventional to group the digitized data words formed from a number of bits into blocks or frames, each of which is indexed by a sync word. Such systems still do not prevent the loss of data within a given frame, which loss will still result in an undesirable shift in the output level or other disturbing electrical noises as well as the actual loss in the intended signals.

In order to prevent the loss of computer or other data processing information, systems have been developed for detecting the presence of errors in a playback signal and for correcting errors so detected. Typically, such data processing recorders enable error correction by providing redundant information which may then be recovered and played back in the event an error in a primary track is discerned. Most simply, such systems provide two (or more) totally redundant data tracks and record the same information on each of the tracks. Particularly, the data on the two tracks may be desirably spatially staggered along the length of the tape such that a single defect spanning both tracks will not cause the loss of the same portion of the signal. While such fully redundant systems are technically feasible, they obviously require twice as much record medium as would otherwise be needed. More sophisticated recorders have also been devised in which error correction codes are generated and recorded along with the digital data, such that when an error is detected, the correction codes are decoded to regenerate a corrected data portion corresponding to the erroneous data. Such schemes also generally utilize multiple tracks, in which one or more tracks may be exclusively devoted to storage of the error correcting code (ECC). See Patel, U.S. Pat. No. 3,745,528 reissued as U.S. Pat. No. Re 28,923. In that patent, the error detection operation provides error pointers (pointing to an erroneous block of data) which are generated by determining the quality of the playback signal, i.e., overall waveforms, etc.

However, not all data or recording systems are amenable to multitrack recording. Particularly, to facilitate compatibility with previously accepted recorder systems for use in audio and video recording, it is desirable to provide a single track digitized recorder in which an error correction operation is also employed. In U.S. Pat. No. 3,913,068 (Patel), a single track recorder is disclosed which utilizes a data format in which error check codes are included at the end of a block of data and in which external indicators are detected to initiate the need for error correction.

As an improvement over the systems discussed above, the above acknowledged related application of Brookhart, Ser. No. 021,177, is directed to a circuit for processing signals to be digitized and recorded on a single track of a suitable record medium. The circuit of that application includes an error correction feature which enables the reconstruction of corrected data in frame in place of erroneous data without the need for externally generated error pointers. The circuit is particularly adapted for use in a digital recorder in which both a record and a playback section are provided. The circuit includes means, such as an analog to digital converter, for converting an input analog audio signal into a corresponding digitized signal and an encoding means for partitioning the digitized signal into a serialized signal containing a succession of frames suitable for recording on the record medium. Each of the frames comprises a preselected number of data words, a preselected number of parity words, an error check word corresponding to the frame and a sync word defining the frame location. The encoding means includes means for generating the parity words of each frame by an exclusive -OR combination of data words of at least two other frames which are preselected according to the expression $$P_K^N = D_{K+j}^{N+n} + D_{K+k}^{N+m},$$

where
- $P_K^N$ is a given parity word located at segment K of frame N,
- $D_{K+j}^{N+n}$ is a given data word located at segment K+j of frame N+n, and
- $D_{K+k}^{N+m}$ is a given data word located at segment K+k of frame N+m.

In these expressions, K, j, k, m and n are all integers, and m and n are not equal to each other or to sero. The thus encoded parity words enable each frame that is incorrectly played back to be detected. The circuit further enables correct data words of the incorrect frame to be reconstructed from the data words of at least one of the other preselected frames in combination with the parity words originally generated from the data words of the incorrect frame and the corrected data words inserted into a serialized playback signal in place of the data words of the incorrectly played back frame.

Preferably, the preselected frames are in turn selected to comprise data words spatially located different predetermined intervals of time from the data words of the given frame such that the intervals of time are sufficiently long to provide a corresponding sufficient separation of the given frame from the preselected frames to minimize the probability that a single defect in a said record medium on which the digitized signal is to be recorded will cause the loss of signal corresponding to both the given frame and the preselected frames.

Analogously, the circuit desirably also includes a playback section including means for providing a digital playback signal corresponding to recorded data on a record medium, means for processing the digital playback signal to determine the presence of an erroneous frame, means for reconstructing a corrected data in a frame and inserting the corrected data in place of the erroneous data and means for converting the processed and corrected digital playback signal into a corresponding analog output signal. The means for locating erroneous data includes means for regenerating an error check code word corresponding to a received frame and means for comparing the regenerated error check word with a received error check code word of that frame to provide a frame error signal indicative of a said erroneous frame in the absence of a match between the two. The frame reconstruction means includes means for temporarily storing playback signals corresponding to each frame until signals corresponding to the preselected frames containing the parity and data words required for reconstruction of data words of said erroneous frame are received. When a frame error signal is received, corrected data words are reconstructed from the received parity and data words within said preselected frames and the reconstructed corrected data words are inserted in the proper spatial location within the processed digital playback signal.

The single track recorder with the error correction feature as described in the referenced application is particularly desirable in that it enables the expense of the record and playback heads to be minimized, and the record medium to be correspondingly narrower, thus facilitating handling the medium. In a preferred embodiment, an audio recorder having a one-inch tape moving at 45 ips has been found suitable for recording 32 parallel tracks in which the data in each track is protected by the error correction feature. Such a system is particularly useful in professional audio recorders where multiple track recording and mixing are desirable features. However, it has now been recognized that the configuration in which the data words from which the parity words are generated are all located ahead in time and spatially ahead on the tape of the parity words, results in the inability to reconstruct data words under certain conditions, and will result in the reconstruction of erroneous data words in the event a tape splice or overrecording is made.

SUMMARY OF THE INVENTION

In contrast to the format utilized in the earlier acknowledged application, the present invention is directed to a signal processing circuit substantially like that there disclosed but in which the encoding means for generating the parity words of a given frame operated on an exclusive -OR combination of data words of at least two other frames, one of which is located ahead in time and recorded spatially ahead on the record medium, and the other of which is located behind in time and recorded spatially after the given frame. Accordingly, the parity words of each frame N are now formatted according to the expression $$P_K^N = D_{K+j}^{N-m} \oplus D_{K+k}^{N+n}$$

where the various terms are as defined earlier.

Such a change, for example, where n and m are equal, allowing the parity words of frame N to be generated from frames, say N+15 ahead and N−15 behind frame N, now enables two primary advantages to be effected. First, in the event a defect is present on the record medium which is less than m or n, 100% of the data can be reproduced. If the defect is larger than n or m, whichever is less, but still less than the sum of m+n, one can reconstruct 50% of the data. Even for a defect longer than m+n, one can still reproduce 50% of the data within a distance m or n from the boundaries of the defect. This represents an improvement over the earlier system disclosed in the referenced application, in which a complete loss of reconstructable data occurs over a section of a defect having a length of n or m, whichever was less.

This advantage results from the placement of the parity words of a given frame N between the data words of frames N+n and N−m. Since the parity word of a given segment K of a frame N is generated from the first or even data word 2K of frame N−m in exclusive -OR combination with the second or odd data word 2K+1 of frame N+n, this results in the data to be used for the reconstruction of the first or even data words of frame N being located a distance n+m back in time. Similarly, the data to be used for the reconstruction of the second, or odd data words of frame N are located a distance n+m ahead in time. Accordingly, even though a defect is present having a length up to n+m, either ahead or behind of frame N, the even or odd half of frame N may still be reconstructed from that data which is then either behind or ahead of frame N, respectively.

The second advantage resulting from the data formats of the present invention relates to the need to enable splicing and overrecording. In the prior method, in the event a "punch-in" such as a splice or overrecording was made, such a "punch-in" was recognized as a defect, and the prior circuit, in an attempt to correct the apparent defect, reconstructs half the data erroneously. In contrast, in the present system, since half the information needed to reconstruct a given frame having a real or apparent error therein is always positioned either ahead or behind the defect, the reconstructed data will be 50% based on the data appearing before the "punch-in", while the other 50% is based on the data within the "punch-in", the net result is that the reconstructed data is 100% correct, being a merger of both the original and "punch-in" portions.

In a preferred embodiment, it is desirable that the encoding means of the circuit include means for temporarily storing a given data word and assembling that word with another data word occurring later in time, to form frames within which spatially adjacent data words correspond to data words displaced in time. Accordingly, a gradual blending of the original and "punch-in" portions over an extended duration may be obtained. Furthermore, if the spatially adjacent portions on the record medium are selected alternatively from even and odd portions of each respective frame segment K, during the transition region, the old and new data occur at a half-sampling rate. This results in consecutive data words within the transition region being alternately taken from the original and punch-in portions respectively such that an even more gradual transition is produced.

Analogously, the circuit desirably also includes a section for reproducing recorded signals which includes means for providing a digital playback signal corresponding to recorded data on a record medium, means for processing the digital playback signal to determine the presence of erroneous signals within a frame, and means for reconstructing data in a frame and for inserting the corrected data in place of the erroneous data. Such a processed and corrected digital playback signal may then, if desired, be converted into a corresponding analog output signal. The means for determining the presence of erroneous data includes means for regenerating an error check code word corresponding to a received frame and means for comparing the regenerated error check word with a received error check code word of that frame to provide a frame error signal indicative of erroneous signals, i.e., of a said erroneous frame, in the absence of a match between the two. The frame reconstruction means includes means for temporarily storing playback signals corresponding to each frame until signals corresponding to the preselected frames containing the parity and data words required for reconstruction of data words of said erroneous frame are received. When a frame error signal is received, corrected data words are reconstructed from the received parity and data words within said preselected frame and the reconstructed corrected data words are inserted in the proper spatial location within the processed digital playback signal.

Preferably, the encoding means of the record section includes means for providing a succession of frames in which each frame contains a selected number of data words and parity words. Desirably, each parity word is divided into two components, each of which are positioned within a given frame immediately after a data word. Further, the parity word generating means preferably includes means for generating the parity words of a given frame from the data words in at least two predetermined spatial locations within different preselected frames, each of which is located a multiple of N frames from the given frame.

Thus, for example, each frame may desirably include sixteen data words, each consisting of sixteen bits, and eight parity words, each consisting of sixteen bits, a four bit synchronization word and a twelve bit error check word, for a total of 400 bits per frame. Each sixteen bit data word, may, for example, be indicative of the amplitude of a corresponding input analog audio signal during a sampling period selected to be less than that corresponding to the highest frequency to be recorded. I.e., in such an example, such an upper frequency would be 20 KHz, having a period of 50 microseconds. Accordingly, a sampling period of 20 microseconds is desirably selected. Each sixteen bit parity word is divided into two eight bit portions, each of which is inserted following one data word.

In an embodiment in which video signals are desirably processed in digital form and recorded in a format suitable for error correction pursuant the present invention, the data may be structured as 8 or 9 bit words, with a predetermined number of such words organized into frames, such words being generated by sampling the video signal at four times the color sub-carrier rate.

Analogously, where high density digital data is to be processed and serially recorded, such as in data cartridge recorders, in a form suitable for error correction pursuant the present invention, the data may be desirably formatted into frames, each of which contains a preselected number of bits, for example, frames 2160 bits long, consisting of 2096 data bits, a 48 bit sync word and a 16 bit error check word.

In all cases, the parity words are preferably generated from data words in two different frames. For example, in one embodiment particularly suited for digitized audio signals, one frame may be located 15 frames previous and the other 15 frames ahead of the frame being then formatted. Further, in that embodiment, the specific parity word within a 16 data word-8 parity word sequence of each frame is preferably generated from the data word in the N+15 frame at the same relative position within the frame (i.e., j=0) and from the data word in the N-15 frame at one successive relative position (i.e., k=1). Generally, the encoding means includes a combination of shift registers and/or random access memories for temporarily storing the received data to enable construction of the parity words from successively received data words. The encoding means also includes means for generating error check word and sync word and means for assembling the respective words to complete each frame.

Analogously, the circuit desirably also includes a playback section including means for providing a digital playback signal corresponding to recorded data on a record medium, means for processing the digital playback signal to determine the presence of an erroneous frame, means for reconstructing a corrected data word in a frame and for inserting the corrected data word in place of the erroneous data word and means for converting the processed and corrected digital playback signal into a corresponding analog output signal. The means for determining the presence of an erroneous frame includes means including shift registers and logic circuits for responding to a received playback signal to generate an error check code word corresponding to a received frame and for comparing the regenerated error check word with the corresponding error check code word received at the end of that frame to provide a frame error signal indicative of a said erroneous frame in the absence of a match between the two. The frame reconstruction means includes means for temporarily storing playback signals corresponding to each frame until signals corresponding to the preselected frames containing the parity and data words required for reconstruction of data words of said erroneous frame are received. When a frame error signal is received, corrected data words are reconstructed from the received parity and data words within said preselected frames and the reconstructed corrected data words are inserted in the proper spatial location within the processed digital playback signal.

Desirably, means including a FIFO memory and associated shift registers are also provided for correcting for "wow" and "flutter" and other time base irregularities in the received playback signal. Such time base correcting means may include means responsive to a fixed clock pulse signal from a playback control and time generator network to lock the received signals at that rate and servo means for controlling drive means for the record medium to ensure that the average periodicity of the sync words are the same as that of the fixed clock pulse signals. The error correction means also preferably includes shift registers and/or random access memories (RAM) as well as associated logic gates and the like which may be controlled by timing signals from the playback control and time generator network. Successive data words may thus be received and stored frame by frame in the RAM such that when a frame error signal is received, a data latch network is activated. Data words from appropriate successive frames are then operated on together with appropriate parity words in a data reconstruction network such as a bank of exclusive OR gates. Reconstructed data words are then fed back to the RAM in the same relative location within the data stream as the original defective data words, and the data words corrected as necessary are coupled out, such as through a parallel to serial data converter, and, if desired, to a digital to analog converting means.

The single track recorder with the error correction feature as herein described is particularly desirable in that it enables the expense of the record and playback heads to be minimized, and the record medium to be correspondingly narrower, thus facilitating handling the medium. In a preferred embodiment for digitalized audio recording, a recorder having a one-inch tape moving at 45 ips has been found suitable for recording 32 parallel tracks in which the data in each track is protected by the error correction feature. Such a system is particularly useful in professional audio recorders where multiple track recording and mixing are desirable features.

In an alternative embodiment adapted for recording digitized video information, a helical recording format may be desired. In such an embodiment, the recording, formatted as 8 or 9 bit data words, would be desirably configured in diagonal tracks along a tape such that the data components enabling error correction are spatially separated along the tape as well as across its width. Accordingly, a single dropout in the tape will affect no more than one frame.

DESCRIPTION OF THE PREFERRED EMBODIMENTS

Reference is made to earlier referenced U.S. application Ser. No. 021,177 in which a similar, but prior recorder is disclosed. That application in its entirety is incorporated herein by reference.

Figure 1:
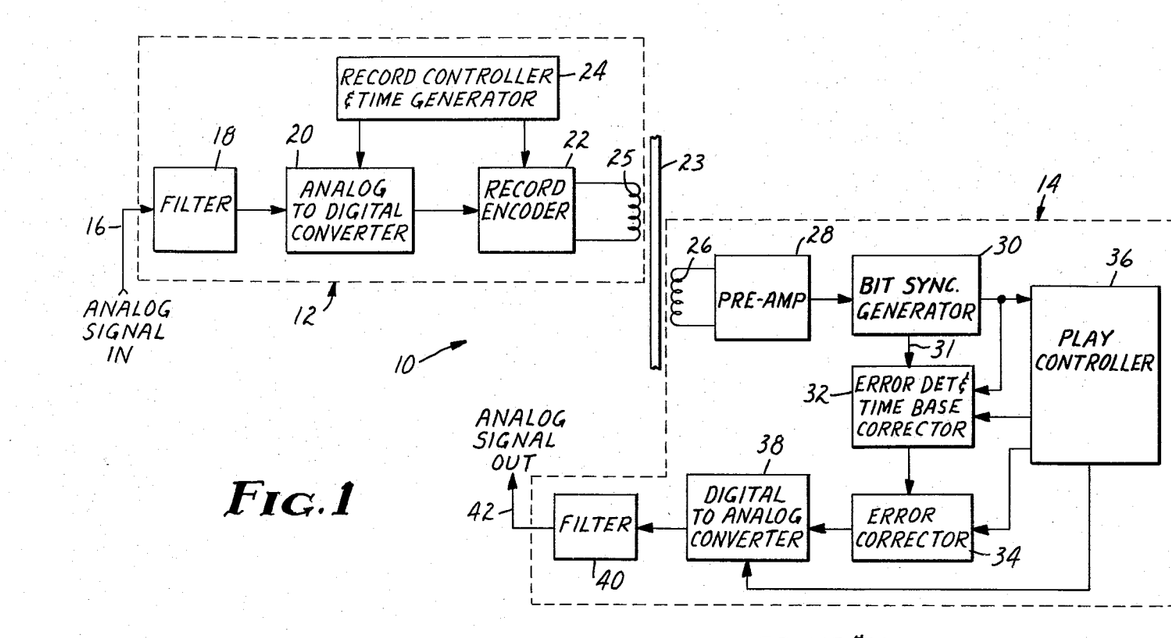
FIG. 1 is an overall block diagram of the digital recorder of the present invention as particularly adapted for processing analog audio signals.

Referring first to FIG. 1, there is schematically shown an overall block diagram of a preferred embodiment for an audio-digital recorder having an error correction feature. As is there shown, the recorder 10 comprises a record section 12 and a playback section 14. An input analog audio signal received at terminals 16 is coupled through a low-pass filter 18 which removes all frequencies in excess of that desirably processed within the recorder. Typically, an upper cutoff frequency of 20 KHz is conveniently provided.

The thus filtered analog signals from the filter 18 are then coupled to an analog to digital converter 20 which converts the analog signal into a corresponding serial formatted digital equivalent. Such an analog to digital converter is conventional in the art and may desirably be purchased as a Model MP 8016 from Analogic Company, or modified as appropriate to provide a suitable number of digital bits corresponding to a desired dynamic range.

The serialized digital signal from the converter 20 is coupled to a record encoder 22. The encoder 22 is described in detail in conjunction with FIG. 3, and processes the serial digital signal so as to partition the serial digital bits into a succession of frames, each of whch includes a plurality of data words, parity words, error correction word and sync word. In so doing, the serial input is converted to a parallel input which is then temporarily stored to enable subsequently received data words to be acted on in order to generate parity words corresponding to the subsequently received data words. These generated parity words are then formatted together with the temporarily stored data words to form a given frame.

The record controller and time generator 24 is coupled to both the A/D converter 20 and to the record encoder 22 to control the sampling time at which the A/D converter 20 generates digital bits corresponding to a given sampling time within the converter 20. In order to ensure reproduction of the highest frequency present in the analog signal, i.e., frequencies up to 20 KHz, it is essential that the sampling period be less than the period associated with such frequencies. Since a 20 KHz signal has a period associated therewith of 50 microseconds, a sampling period of 20 microseconds is desirably provided. The recorder controller and time generator 24 is further coupled to the record encoder 22 in order to provide appropriate timing signals therein to control the length of each of the data, parity, error correction and sync words within the formatted digital signal. Preferably, the data words and parity words generated therefrom are processed in parallel digital form. After the appropriate processing to generate the parity words is completed, the parity and data words are coupled through parallel to serial converters such as conventional shift registers to provide a serial output. Serial outputs corresponding to the data words, parity words and corresponding to serial formatted error code words and sync words are then coupled through a controller output switch to provide the respective data words in appropriate sequences. The thus formatted frames are preferably coupled through a delay modulation pulse generator network to provide an output signal suitable for recording on a suitable record medium utilizing a minimum bandwidth requirement. Such an output signal is coupled to a suitable record transducer such as a magnetic recording head 25.

The playback section 14 of the recorder 10 is adapted for playing back signals recorded on a record medium such as the magnetic recording tape 23, for detecting errors in the playback signal and for correcting such detected signals. The playback section 14 thus includes a playback transducer 26 such as a conventional magnetic playback head, the output of which is coupled to a preamplification and equalization circuit 28. This network desirably encompasses conventional circuits for interfacing a conventional magnetic pickup head with successive amplification and signal processing circuits. The circuit 28 provides an additional amplification stage for the received signal from the playback head 26 and provides equalization to compensate for amplitude and phase nonlinearities. The circuit 28 also includes a limiter for converting the flux transitions detected by the head into a digital delay modulated signal which generally corresponds to that recorded onto the record medium 23. The preamplification and equalization circuit 28 thus preferably may include an impedance matching transformer which couples the playback head 26 to an integrated circuit amplifier such as Type CA 3095 manufactured by RCA Company. The output from the integrated circuit amplifier may be coupled to a limiter, such as a zero crossing detector, which converts the quasi-digital signal as there amplified into a more readily processable, standardized delay modulation digital signal. The standardized signal is coupled to a bit-sync generator 30 which generates a clock signal corresponding to the rate of the data being reproduced at a nominal frequency of 1.25 MHz, and also generates a frame sync signal corresponding to a nominal frequency of 3.125 KHz, which signals are subsequently used for controlling the data processing operations. Further, the delay modulated digital signal is there processed through conventional decoding circuits to provide a non-return to zero (NRZ) digital formatted signal on lead 31.

The NRZ signal is coupled through lead 31 to the error detector and time base corrector 32, which, in response to control signals from the generator 30, generates the frame error signal in response to the detection of an erroneous frame. The corrector 32 is set forth in more detail in a block diagram of FIG. 4, and may be generally viewed as comprising two basic features, one dealing with error detection and one with time base correction. The error detection operation is effected through a cyclical redundancy code (CRC) check circuit. The CRC check circuit generates a CRC check word from the reproduced signals and provides a frame error output signal indicative of the absence of a match between the generated CRC check word and the CRC code word received at the end of each frame. The time base correction portion of the corrector 32 includes input and output timing networks responsive to signals from the sync generator and to fixed clock signals from the play controller 36. Any deviation between the signals received from the sync generator 30 and the fixed clock signals are automatically corrected and any deviation such as that associated with "wow" or "flutter" from the playback mechanism are removed.

Figure 5:
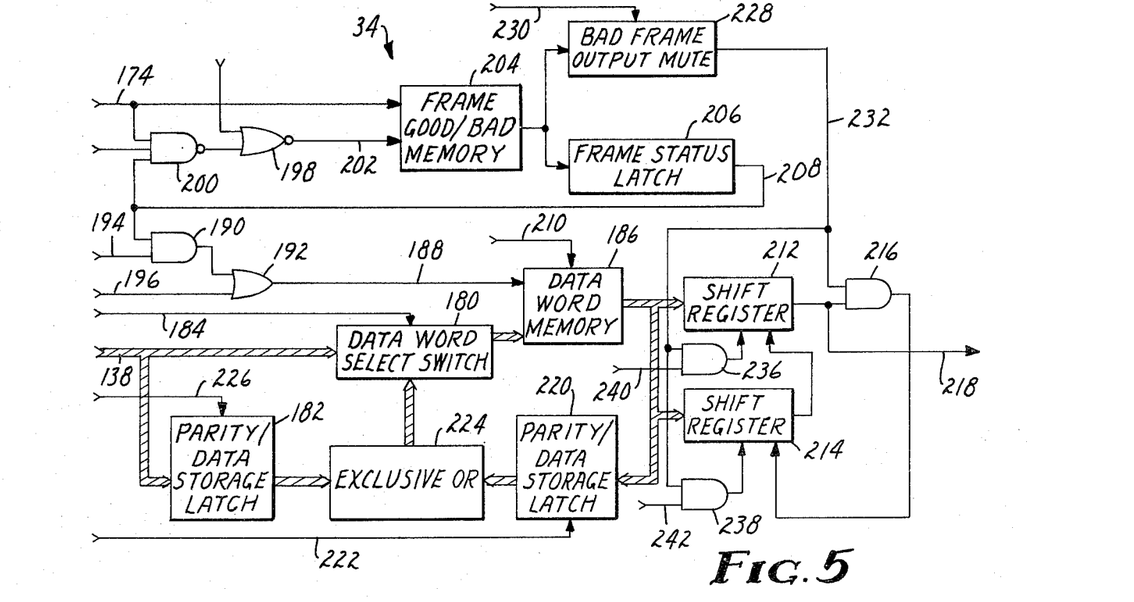
FIG. 5 is a block diagram of an error corrector within a playback section.

The output from the error detector and time base corrector 32 are coupled to the error corrector 34 as shown in more detail in the block diagram of FIG. 5. The error corrector 34 responds to a frame error signal in order to initiate error correction procedures. Data words and parity words received from the time base corrector 32 are split from the remaining information in the frame within the error corrector 34, and the data words and parity words are both temporarily stored in a cyclically driven data word memory. Upon appropriate instructions from the error detector 32 and the controller 36 indicative of the presence of erroneous words within a given frame, appropriate previously received data words are operated on together with appropriate parity words to reconstruct corrected data words. The reconstructed and corrected data words are then reinserted in the data word memory.

The successive frames, containing corrected data words as necessary, are coupled through appropriate shift registers to provide a corrected serialized output. This serial output is coupled to a digital to analog converter 38 such as a Type DAC 169-16 converter manufactured by Datel Systems, Inc. The resultant analog output signal is then desirably coupled through a low-pass filter 40 to remove any high frequency noises as may be present in the signal due to the digital processing operations. The thus processed analog audio playback signal is then coupled to an output terminal 42.

Figure 2:
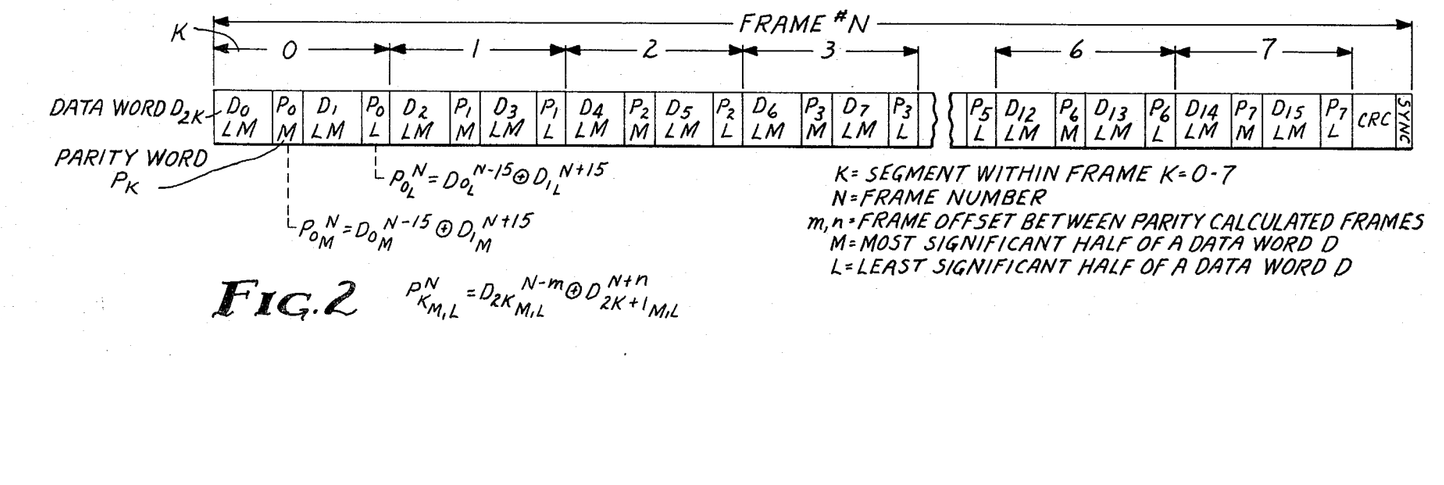
FIG. 2 shows the format of the data encoded according to one embodiment of the present invention and as recorded on a magnetic recording tape.

FIG. 2 shows a recording format for the audio information as presented in digital form together with appropriate codes enabling the error correction operations according to the present invention. As may there be seen, data within a given frame (N) is desirably formatted within a succession of eight segments (K) ranging from 0 through 7. Each of the segments K in turn includes a first and second, or even and odd data word $D_0$ through $D_{15}$, and one parity word, each of which is divided into a most significant $P_{KM}$ and least significant $P_{KL}$ component. Preferably, the even data words $D_0$, $D_2$, $D_4$, etc. are held in memory for a selected time, i.e., a time corresponding to a 30 frame period, and are then assembled in the frame N together with the odd data words $D_1$, $D_3$, $D_5$, etc., which occur in real time. Each frame is completed by an error check code word, such as a cyclical redundancy code word and a synchronization code word. Each of the data words $D_0$ through $D_{15}$ comprises a 16 digit analog of the intensity of a given sample of the input analog signal. Each of the digital samples consisting of 16 digital bits is repeated every 20 microseconds, thereby providing a train of digital bits, the duration of each of which is 1.25 microseconds. Within the record encode network 22, the digitized data words are compressed into a framework wherein each bit has a duration of 0.8 microseconds, so as to provide time within each frame for the associated parity words, error check words, and synchronization words without expanding the time required for a given frame to be recorded. Thus, in the recorded format, each of the 16 data words $D_0$ through $D_{15}$, comprising 16 bits each, extends over a duration of 12.8 microseconds. The component of the parity words $P_{0M}$ and $P_{0L}$ through $P_{7M}$ and $P_{7L}$ each comprise 8 bits which also have a duration of 0.8 microseconds and thus extend 6.4 microseconds. Finally, the error check word in the form of a cyclical redundancy check, is generated on both sides of the preceding 16 data words and alternating parity word components and includes 12 bits, i.e., a duration of 9.6 microseconds. Completing each frame is the synchronization word which consists of a 4 bit signal, i.e., a duration of 3.2 microseconds. Accordingly, each entire frame (N) has a total duration of 320 microseconds which is recorded in real time in synchronization with the 16 data word samples within the frame, each of which persists for 20 microseconds for a total sampled period of 320 microseconds.

As is further shown in FIG. 2, each of the parity words $P_{0M}$ and $P_{0L}$ through $P_{7M}$ and $P_{7L}$ within a frame N is generated from data words of frames which are spatially located a sufficient distance on both sides of the frame N that a single defect on a record medium will not cause the loss of both of the frame N and the frames from which the parity words of the frame N are generated. Thus, for example, in a preferred embodiment, the parity words $P_{KM}$ and $P_{KL}$ respectively, for each segment K within the frame N will be generated from the data words $D_{0M}$ and $D_{0L}$ respectively of frame $N-15$ combined through an exclusive OR circuit, shown symbolically as $\oplus$, with the second or odd data words of a like segment, i.e., $D_{1M}$ and $D_{1L}$ respectively, of frame $N+15$. Such relationships may be shown according to the following generalized expression:

$$P_{KM,L}{}^N = D_{2KM,L}{}^{N-m} \oplus D_{(2K+1)M,L}{}^{N+n}$$

where $P_K{}^N$ is a parity word at position K within frame N, $P_{KM}$ referring to the parity words generated from the most significant half of the corresponding data words $D_{2KM}$ and $D_{(2K+1)M}$ and $P_{KL}$ referring to the parity words generated from the least significant half of the data words $D_{2KL}$ and $D_{(2K+1)L}$; and where n is the offset between the frames of which the parity words of frame N are generated.

More specifically, the expressions for the parity words $P_{KM}$ and $P_{KL}$, i.e., corresponding to the most and least significant portions respectively of the data words $D_{2K}$ and $D_{2K+1}$ from which the parity words are generated are:

$$P_{KM}{}^N = D_{2KM}{}^{N-m} \oplus D_{(2K+1)M}{}^{N+n}$$

and $$P_{KL}{}^N = D_{2K1}{}^{N-m} \oplus D_{(2K+1)1}{}^{N+n}$$

In a preferred embodiment, n and m are selected to be 15 such that for a given segment $K=0$ of frame N, the parity words $P_{0M}$ and $P_{0L}$ will be:
$$P_{0M}{}^N = D_{0M}{}^{N-15} \oplus D_{1M}{}^{N+15} \text{ and}$$
$$P_{0L}{}^N = D_{0L}{}^{N-15} \oplus D_{1L}{}^{N+15}$$

Similarly, for position $K=1$ at frame N:

$$P_{1M}{}^N = D_{2M}{}^{N-15} \oplus D_{3M}{}^{N+15} \text{ and}$$
$$P_{1L} = D_{2L}{}^{N+15} \oplus D_{3L}{}^{N+15}$$

And, for position $K=2$ at frame N:

$$P_{2M}{}^N = D_{4M}{}^{N-15} \oplus D_{5M}{}^{N+15} \text{ and}$$
$$P_{2L}{}^N = D_{4L}{}^{N-15} \oplus D_{5L}{}^{N+15}$$

It may thus be seen, that in the preferred embodiment of the present invention, an improved error correction scheme is set forth as described above.

In a further embodiment adapted for recording high density digital information, the discrete nature of the digital data dictates formatting the data into records and files of varying length, each containing frames of a predetermined number of data words. Since subsequent replacement or re-reading of a given file or record is required, permanently stored marks or "keys" at the beginning of a record and a inter record gap (IRC) at the end of a record must be provided for. In such an embodiment, a synchronization code and cyclical redundancy code (CRC) in each frame will be used as in the digitized audio embodiment. However, a different synchronization word must be used due to the discrete nature of the digital data. Also, a longer CRC is desirably used for enhanced reliability for longer frames. Thus, sync may be obtained by a short unrecorded gap 16 bits long, followed by 47 "zero" bits and 1 "one" bit. Each frame is desireably 2096 bits long, and the CRC word 16 bits long, thereby providing adequate error detection capabilities for the long data frames.

The parity words in such an embodiment are generated according to the expressions:

$$P_K{}^N = D_{K+j}{}^{(N+n)} \oplus D_{K+k}{}^{(N+m)}$$

where
$P_K{}^N$ is a given parity word located at segment K of frame N,
$D_{K+j}{}^{(N+n)}$ is a given data word located at segment $K+j$ of frame $N+n$, and
$D_{K+k}{}^{(N+m)}$ is a given data word located at segment $K+k$ of frame $N+m$.

In the expressions K, j, k, m and n are all integers, and m and n are not equal to each other or to zero. Specifically, in a preferred case, $N=5$ or 6 (i.e. there will be 5 or 6 frames within a given record, each record being designated by an initiate key and an inter-record gap (IRG) signal), $K=1$ to 262, $m=-2$, $n=-4$, $k=0$ and $j=0$. For example, the data and parity words are each 8 bits long.

In such an embodiment, the parity words are all grouped together within parity containing frames which may be located wherever desired relative to the data containing frames of the record. Thus, for example, it is desirable to designate frames 3 and 4 of a 6-frame record as the parity containing frames, and to construct the parity words of frame 3 from the exclusive-OR combination of the data words of frames 1 and 5, while the parity words of frame 4 are constructed from the data words of frames 2 and 6, the length of each of the frames in this embodiment being sufficiently long to ensure adequate spatial separation. Accordingly, the first parity word of frame $N=3$ is simply the exclusive OR combination of the first data word of frame $N=1$ and the first data word of frame $N=5$, i.e., $$P_1{}^3 = D_{1+0}{}^{3-2} \oplus D_{1+0}{}^{3+2}.$$

and $$P_1{}^4 = D_{1+0}{}^{4-2} \oplus D_{1+0}{}^{4+2}.$$

In such an embodiment, at a tape speed of 60 ips, these data words and their associated frames are spatially separated by 0.216 inches. In the digitized audio example, they are separated by 0.202 inches. This spacing is necessary and vital to the reduction of errors due to dropouts. The optimum spacing, along with the optimum frame size are determined by the playback track width, the physical properties of the tape, i.e., the dropout particle size, and the recording density. Likewise, the selected values of K and N will vary accordingly.

Figure 3:
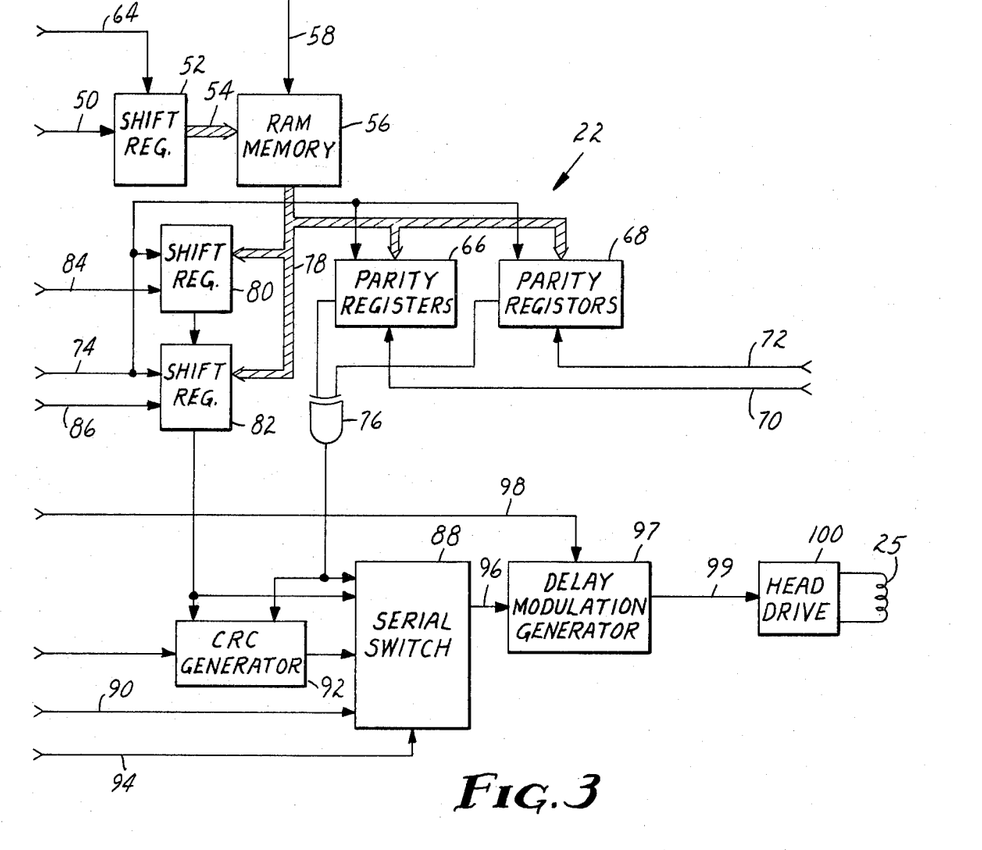
FIG. 3 is a block diagram of the record encoder within the record section of one embodiment of a recorder of the present invention.

The block diagram of FIG. 3 sets forth details of a preferred embodiment of the record encoder 22 of FIG. 1. As may there be seen, serialized digital data from the A/D converter 20 received on lead 50 is coupled to an 8 bit shift register 52, such as a Type 74LS164 integrated circuit module manufactured by Texas Instruments, Inc. (T.I.). The shift register 52 converts the serialized input digital information into a parallel output signal as denoted on the double leads 54. The parallel outputs are fed to a random access memory (RAM) 56, such as a bank of eight Type 2102 integrated circuit RAM memory elements, manufactured by N.E.C., which stores the data words of successive frames to enable the generation of parity words from the N−15th and N+15th frames. The Ram memory 56 provides a storage capacity of 1,024 bits per element, thus providing sufficient capacity to store the 30 frames, each of which contains 256 bits, i.e., a required capacity of 960 bits per register. The locations within the memory 56 in which the individual parallel signals are stored are controlled by outputs on lead 58 from the record controller 24. The controller 24 thus provides outputs to generate each address within the memory 56 at which the respective outputs from the shift register 52 are stored. The shift register 52 is also controlled by a signal on lead 64 from the controller 24 to enable the transfer of the serial data words inputed on lead 50 out on leads 54. In order to generate the parity words, the outputs from the RAM memory 56 are coupled to parity registers 66 and 68, which may preferably be IC circuits such as Type LS165, manufactured by T.I. The first of the parity registers 66 is controlled by signals from the record controller 24 on lead 70 to generate a parity word based on data words occurring N−15 frames earlier. I.e., data words located 15×256 bits or 3840 bits after a given data word is shifted into the register 66 by an appropriate command signal from the controller 24.

Similarly, the parity register 68 is controlled by timing signals on lead 72 from the record controller 24 to generate a parity word based on data words occurring in one successive position within the N+15th successive frame. Thus, data words located 15×272 (i.e., one frame of 256 bits plus one additional 16 bit data word) or 4080 bits after a given data word, are shifted into the register 68 by an appropriate timing signal from the controller 24. The output from each of the parity registers 66 and 68 are then serially shifted out in response to a common clock control signal on lead 74, and are combined in the exclusive OR gate 76 to produce the parity words. The even data words are delayed 30 frames within the memory 56 and then are outputed in parallel form on leads 78 to shift registers 80 and 82 in response to control signals on leads 84 and 86 from the controller 24. In contrast, the odd data words within the memory 56 are outputed undelayed. The serialized equivalent to the most significant and least significant portions of a given data word are then outputed from the shift registers 80 and 82 and are coupled with the appropriate parity words from the exclusive OR gate 76 in a serial switch 88. Also coupled into the switch 88 are sync signals on lead 90 from the controller 24 as well as a CRC code word from the CRC generator 92 generated in response to signals from the register 82 and gate 76. The CRC generator 92 is preferably an integrated circuit type such as 9401 manufactured by Fairchild Semiconductor Corp. Each of the respective four inputs into the switch 88 are appropriately gated out in response to control signals on lead 94 from the record controller 24. The serial switch 88 thus provides on output lead 96 a fully formatted serialized digital signal containing the appropriately sequenced data words and parity words within a given frame followed by the CRC check word and sync words. The serial signal on lead 96 is coupled to the delay modulation generator 97 together with timing signals on lead 98 from the controller 24 corresponding to a fundamental frequency (Fo) clock rate of 1.25 MHz, a 2Fo clock rate and a missing transition control signal. The thus processed digital signal from the generator 97, in delay modulation form, is coupled through lead 99 to a head driver circuit 100, which amplifies the digital signal, and applies the amplified signal to a record head 25, such that the thus processed delay modulated signal is recorded on a suitable record medium such as conventional magnetic recording tape.

Figure 4:
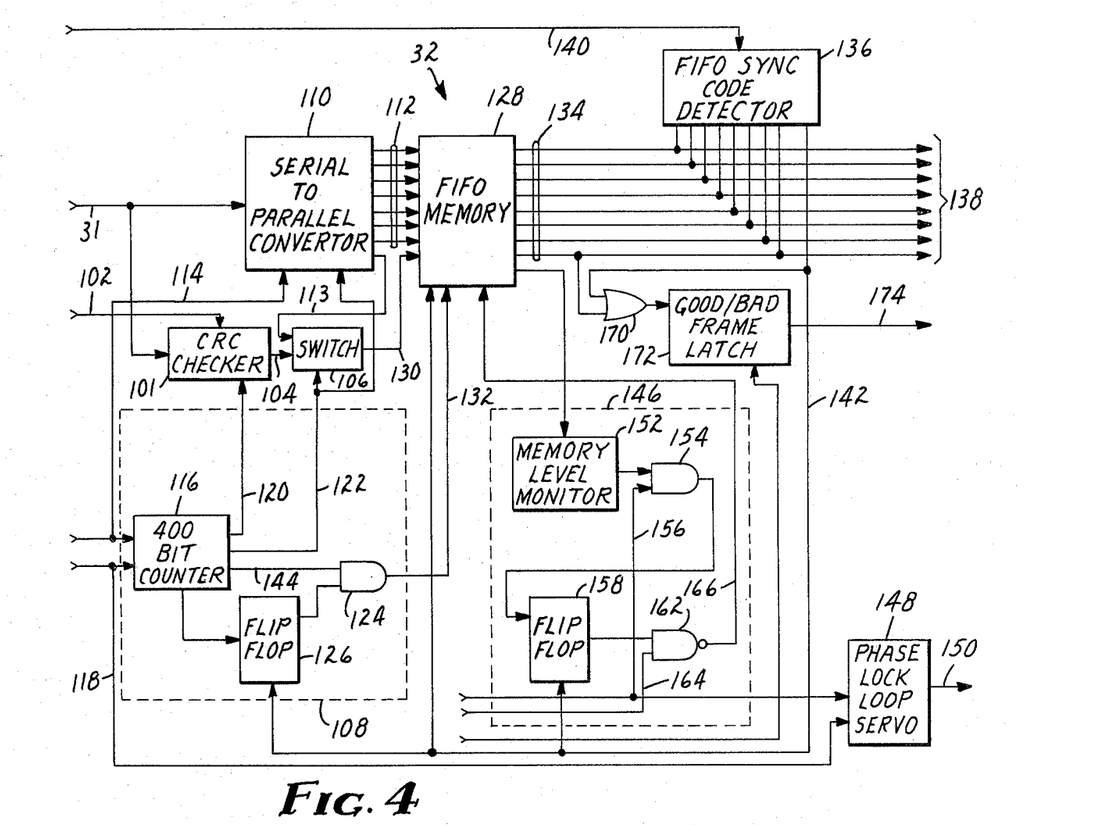
FIG. 4 is a block diagram of an error detection and time base corrector within a playback section of a recorder pursuant one embodiment of the present invention.

Details of the manner in which signals are processed during playback to detect erroneous data and to provide correction of the time base of the retrieved signals are set forth in the block diagram of the error detector and time base corrector shown in FIG. 4 as discussed in full in the incorporated patent application Ser. No. 021,177.

The details of the error corrector 34 are shown in the block diagram in FIG. 5. In this figure, the eight parallel outputs from the FIFO memory 128 of the error detection and time base corrector are shown coupled on leads 138 to a data word select switch 180 and to a parity/data storage latch 182. The switch 180 is in turn controlled by a timing signal on lead 184 from the play controller 36. This signal in turn controls the switch 180 such that the data words on the input leads 138 are coupled to a cyclically driven data word memory 186. The memory 186 preferably comprises a bank of random access memories (RAM) such as Type 2102 integrated circuit manufactured by N.E.C. The RAM 186 is in turn controlled by a read/write control signal on lead 188, which signal is provided from the AND and OR gates 190 and 192, respectively, in response to write-correction and write-data signals on leads 194 and 196, which signals are provided by the play controller 36.

The frame error signal on lead 174 which controls the overall error correction process is coupled to a frame status select switch comprising gates 198 and 200. This switch provides a signal on lead 202 to the frame good/bad memory circuit 204. The output of the memory 204 is then coupled to a frame status latch 206 to provide a RAM read/write control signal on lead 208. The signal on lead 208 is coupled back to the input of the AND gate 200 to further control the frame status switch and is also coupled to the AND gate 190 to control the production of the read/write correct signal on lead 188. As thus configured, the data word memory 186 is cyclically driven by control signals from the play controller via leads 210 such that the data words of successive frames are sequentially entered and stored at locations corresponding to their real time relationship. These control signals further cause the data words of each frame to be successively outputed from the memory 186 as the data words of a next successive frame, N+30 frames later in time, are successively received. The outputed signals from the memory 186 are coupled to shift registers 212 and 214 to convert the parallel data into serial form. The registers are preferably integrated circuit types such as LS 165. The serial output signal is coupled onto the output lead 218, whence the signal is fed to the digital to analog convertor 38 as shown in FIG. 1.

The output from the data word memory 186 is also coupled to a data storage latch 220, and in response to a data store signal from the play controller 36 on lead 222, couples the data words then present at the data word memory 186 to a bank of exclusive OR gates 224. The parity/data storage latch 182 is also controlled by signals on lead 226 from the play controller 36. As will be described in detail hereinafter, the foregoing portion of the error corrector circuit enables the correction of erroneous data words within a given frame.

In addition to such correction features, the error corrector 34 also includes circuits for muting the output in the event no correction is possible. That portion of the circuit includes a bad frame output mute 228 which is coupled to receive signals from the frame good/bad memory 204, and which is also controlled by input signals on lead 230 from the play controller 36. The output of the bad frame output mute 228 is coupled on lead 232 to the AND gate 216 where it is coupled together with the output from the shift registers 212 and 214. The output of the bad frame mute 228 also controls loading of noncorrectable data words from the RAM memory 186 into the shift register 212 through AND gate 236, and into shift register 214 through AND gate 238, by inhibiting load pulses from the play timing generator on leads 240 and 242. If a single uncorrectable data word is determined, the signal on lead 232 prevents the loading of new data by inhibiting the load pulses on leads 240 and 242 to the AND gates 236 and 238, respectively. Thus the previous correct data word is repeated. At the same time recirculation of the previous word back into the shift registers 212 and 214 is prevented such that if two consecutive uncorrectable data words occur, digital zero's will be inserted to mute the output during the following cycle.

The operation of the error corrector 34 may generally be described as follows. Assuming as an arbitrary starting point that a given previous frame (N+1) has just been processed and the first even data word of a new frame N is arriving into the error corrector, it will be recognized that the data words of N−15 are already in storage in the memory 186. As the least significant portion of the first, even data word of frame N is received, it is stored within the memory 186 in an empty memory location one frame away from the corresponding odd word of that frame, which was stored N+30 frames earlier, and is also loaded into the parity/data storage latch 182.

The parity word which corresponds to the data words of the just received frame N was earlier (i.e., 15 frames earlier) stored in memory 186. This word is read out at a time corresponding to N+15, and entered into the parity/data storage latch 220. The data word selector switch 180 is set by a signal on control line 184 to select the outputs of the bank of 8 exclusive OR's 224 as the input to the data word memory 186.

Then, the good/bad status of frame N+30 is read out from memory 204 and is latched into the frame status latch 206. If frame N+30 is bad, gate 190 allows the write pulse on lead 194 to be sent to the data word memory on lead 188, thereby overriding the least significant of the bad odd data words at N+30 with the reconstructed data word waiting at the output of the data word select switch 180.

In a like manner, the most significant portion of the first even word is next received and processed. The most significant portion of the first parity word Po of segment K=0 of frame N is then received and coupled to the data word memory 186 and to the parity/data storage latch 182 as before. It is written into the data word memory at the most significant portion of the first even word location of frame N. The odd data word at N+15 is then read from memory and is stored in the parity/data storage latch 220. The bank of exclusive OR's 224 then forms a possible reconstruction of the even data word N+15, and it is written into the memory at the previous location of the parity word just used in the reconstruction, under control of a write signal on lead 196. The data word select switch 180 is set to allow the exclusive OR's 224 to provide the input to the data word memory by control signals on lead 184.

The next data to arrive is the least significant portion of first odd word of segment K=0 of frame N. In response to a write pulse on lead 196, this data is written into memory 186 at the least significant portion of the odd word location of segment K=0 of frame N. The memory 186 is then stepped forward and the next 8-bit group consisting of the most significant portion of the odd data word is entered into the remainder of the odd word location of segment K=0. The least significant parity word then arrives and the same sequence of operations is initiated, operating, of course, only on the corresponding least significant data portions. Successively received data of subsequent frame segments are similarly processed in repetitions of the above cycle.

Having now provided reconstructed data, the following sequence is followed to cause the data to be outputed from the memory 186 to the shift registers 212 and 214.

For an even word, the first attempt to readout the even word reconstructed 15 frames earlier and stored at the even word locations of frame N+30 is initiated by a signal on control line 210. Coincidentally the good/bad frame status of parity in frame N+15 and odd data in N+30 which was used in that reconstruction is inputted into the bad frame output mute 228.

If the status of both frames N+15 and N+30 is good, the most significant portion of reconstructed even word is loaded into shift register 212, and least significant portion into register 214. Then, the actual even data word in memory 186 at location N+31 is attempted to be loaded into the respective shift registers under control of its frame status, which was earlier read into the bad frame output mute 228. If it is determined to be good, it is allowed to override the reconstructed even word that was provisionally loaded into the register. If neither load of the reconstructed or the actual even word are allowed, the information left in the shift register is that remaining in it from the output of gate 216, which is either a series of digital zeros, or the previous data word depending on whether or not that previous data word was correct.

The odd word of segment K=0 has already been corrected within memory 186, provided such correction was necessary and possible as described above. The good/bad frame staus of the frames used to attempt the correction in memory, i.e., parity word at N+15 and even data word at N, are read into the mute 228. If the status of both words is good, the output from mute 228 allows entry of the most significant half of the odd data word into register 212, and the least significant half into register 214. Then, the good/bad frame status of the actual word, as opposed to the reconstructed word, is read into the mute 228, and again the halves of the data word are attempted to be loaded into the respective shift registers. If both sets of good/bad frame status are bad such that no load was made into the shift registers, then all zeros (mute) or the previous word will be outputted as discussed above, thus completing the outputting of the first segment K=0 of frame N. The subsequent frame segments are then similarly processed.

The above described operations thus continue on for the 16 data words of a given frame. At the end of the frame, the frame good/bad status of that frame in which the parity words may be used finally arrives, such that that information can then be used to determine whether or not the corrected information that has been entered into the memory 186 is actually a valid or good correction. This good/bad frame status is stored in frame good/bad memory 204 in a position corresponding to the data of that frame as stored in the data word memory 186.

In the preferred embodiment described above, the condition for correcting data is that only two of the three frames that have been used were good, such that if the good/bad status of the frames from which the parity were constructed was good, and the alternate of either the frame N+15 or N+30 was good, then a corrected data word could be constructed and written into the memory 186 in the appropriate position of N+30 or N+15. In an analogous fashion, similar systems may also be constructed in which three out of four or four out of five reconstruction techniques are utilized.

The specific circuits provided in the play controller 36 are state of the art and are simply those required to provide the appropriate control signals as described to the respective other portions of the playback section 14. The controller 36 thus includes a crystal clock generator for providing a fixed clock pulse as well as appropriate counters, such as, for example, a 400 bit counter which may be preferably an integrated circuit type such as 74LS393. Other circuits for generating appropriate commands at other intervals throughout a given frame sequence are similarly constructed of conventional counters, registers and logic gates.

Likewise, while specific circuits have been discussed hereinabove as adapted for use with a digitized audio recorder pursuant the present invention, specific circuits adapted for use with digitized video are readily provided in consonance with the state of the art, following the general signal processing format disclosed hereinabove. So too, specific circuits adapted to process high density digital data, consistent with desired longer frames, may readily be provided.

Having thus described the present invention, what is claimed is:

1. A circuit for processing digital signals to be recorded on a single track of a suitable record medium, said circuit comprising means for encoding said digitized signal into a serialized signal suitable for recording on said record medium, said serialized signal containing a succession of frames in which each frame comprises a preselected number of data words, a preselected number of parity words, an error check code word corresponding to the frame and a sync word defining the frame location, said encoding means including means for generating the parity words of each frame by an exclusive −OR combination of data words of at least two other preselected frames according to the expression:

$$P_K^N = D_{K+j}^{(N-m)} \oplus D_{K+k}^{(N+n)}$$

where
$P_K^N$ is a given parity word located at segment K of frame N,
$D_{K+j}^{(N+n)}$ is a given data word located at segment K+j of another preselected frame N+n located N frames ahead of frame N, where J is an integer,
$D_{K+k}^{(N-m)}$ is a given data word located at segment K+k of yet another preselected frame N−m, located m frames in back of frame N, where K is an integer, k is an integer, and m and n are integers not equal to 0, whereby each frame which is incorrectly played back may be detected, correct data words of that frame may be reconstructed from the data words of at least one of said other preselected frames N+n, located ahead of frame N in combination with the parity words $P_K$ generated from the data words of that frame and which are located behind frame N such that the placement of the parity words $P_K$ between the data words $D^{N+n}$ and $D^{N-m}$ ensures the availability of correctable data at every given position along the medium within the bounds of N−m to N+n and the corrected data words inserted into a serialized playback signal in place of the data words of the incorrectly played back frame.

2. A circuit according to claim 1, wherein said encoding means includes means for generating each parity word $P_K^N$ from the exclusive OR combination of data words $D_{2K}^{N+n}$ and $D_{2K+k}^{N-m}$ such that n and m are sufficiently large integers that frames N+n and N−m are each spatially separated from frame N an interval of time to minimize the possibility that a single defect on a record medium onto which the encoded signals are recorded will cause a loss of signals upon playback from both frame N and either frame N+n or frame N−m.

3. A circuit according to claim 2 wherein m=n such that said parity word generating means generates the parity words of frame N from frames located n and −n frames from frame N.

4. A circuit according to claim 2, wherein said parity word generating means includes means for generating the parity words at each spatial segment K of said frame N from the data words at a predetermined segment 2K of frame N+15 and from the data words at a predetermined spatial segment 2K+1 of frame N−15.

5. A circuit according to claim 1, wherein said encoding means further comprises means for temporarily storing a given data word and assembling said word with another data word occurring later in time to form frames within which spatially adjacent data words correspond to data words displaced in time.

6. A circuit according to claim 1, further comprising a playback section including (a) means for providing a digital playback signal corresponding to recorded data on a said record medium, (b) means for processing said digital playback signal to determine the presence of erroneous signals within a frame including means for regenerating an error check code word corresponding to a received frame and means for comparing the regenerated error check word with a received error check code word of that frame to provide a frame error signal indicative of said erroneous signals in the absence of a match between the two, and (c) means responsive to a frame error signal for reconstructing a corrected data word and for inserting the corrected data words in place of the erroneous signals, including means for temporarily storing playback signals corresponding to each frame until signals corresponding to the preselected frames containing the parity and data words required for reconstruction of data words of said erroneous frame are received, means for reconstructing corrected data words from the received parity and data words within said preselected frames and means for inserting the reconstructed corrected data words in the proper spatial location within the processed digital playback signal.

7. A circuit according to claim 6, wherein the frame reconstruction means of the playback section includes memory means synchronized to the play control and time generator means and responsive to the data words and parity words of each frame and to the error frame signals from the processing means for cyclically storing said data words, said parity words, and said frame error signals, error frame correction circuit means comprising a pair of parity/data word latch means, and exclusive OR circuit means responsive to the status of the parity/data latch means and to regenerate corrected data words in response to an error frame signal, wherein the corrected data words are coupled through the exclusive OR means and are reinserted into the memory means in place of the previously stored data words of the detected erroneous frames.

8. A circuit according to claim 1, adapted for processing analog audio signals to be digitized and serially recorded, further comprising means for converting an input analog audio signal into a corresponding digitized audio signal for subsequent encoding as said input digitized signal.

9. A circuit according to claim 1, adapted for processing video signals to be digitized and serially recorded, further comprising means for converting an input analog video signal into a corresponding digitized video signal for subsequent encoding as said input digitized signal.

10. A circuit according to claim 1 adapted for processing high density digital data, wherein said encoding means includes means for formatting a given record of digital data into a train consisting of a plurality of frames, each frame containing a preselected number of data words, the beginning of each said record being identified by an initiate key signal and having an inter record gap signal associated with the end of the record.

11. A circuit according to claim 10 wherein said encoding means includes means for formatting frames wherein $K=1$ to 262, $m=+2$, $n=-2$, $k=0$, and $j=0$.

12. A circuit according to claim 1, wherein the playback section further includes means for converting the processed and corrected digital playback signal into a corresponding analog output signal.

* * * * *